United States Patent

[11] 3,614,177

| | | |
|---|---|---|
| [72] | Inventors | Kenneth L. Magee;<br>John F. Wilson, both of Racine, Wis. |
| [21] | Appl. No. | 831,027 |
| [22] | Filed | June 6, 1969 |
| [45] | Patented | Oct. 19, 1971 |
| [73] | Assignee | J. I. Case Company<br>Racine, Wis. |

[54] CHAIN BUSHING AND METHOD OF MAKING SAME
4 Claims, 7 Drawing Figs.

[52] U.S. Cl. .................................................. 305/57,
29/148.4, 74/251, 305/58
[51] Int. Cl. .................................................. B62d 55/08
[50] Field of Search.......................................... 305/58, 57,
59; 74/251, 255, 256; 59/8, 78; 29/148.4

[56] References Cited
UNITED STATES PATENTS

| 310,997 | 1/1885 | Heald ........................... | 74/251 |
| 2,678,569 | 5/1954 | Bremer ......................... | 74/251 X |
| 3,206,258 | 9/1965 | Heinrich ....................... | 305/58 X |

Primary Examiner—Milton Buchler
Assistant Examiner—John J. McLaughlin
Attorney—Settle, Batchelder and Oltman ABSTRACT: A bushing for interconnecting links of a track chain and which has inclined bearing surfaces which cooperate with corresponding surfaces defined on teeth of a drive sprocket. The bushing is formed from a blank having a first wall defined by a partially developed surface capable of defining the wall of a circular aperture in its final configuration and defined between opposite ends. The blank also includes a second opposed wall having spaced arcuate surfaces interconnected by an intermediate recessed area. The blank is deformed, as by rolling, to reposition the partially developed surface to define the wall of a circular opening and locate the surfaces angularly with respect to each other and parallel to the axis of the opening or aperture. The ends of the first wall are interconnected and the blank cut into sections with the opposite ends subsequently operated upon to produce circular hubs surrounding the opening on opposite ends of each section.

INVENTORS
KENNETH L. MAGEE.
JOHN F. WILSON.
BY SETTLE, BATCHELDER & OLTMAN.
ATT'YS.

3,614,177

CHAIN BUSHING AND METHOD OF MAKING SAME

BACKGROUND OF THE INVENTION

The present invention relates generally to track chains for track-type vehicles and more particularly to an improved driving connection between the drive sprocket of the vehicle and the track chain as well as an improved method of making the same.

As is well known, crawler tractors are conventionally utilized in an environment wherein the entire track assembly is subjected to considerable wear and extreme forces, as well as dirt and other debris. In crawler tractors, it is conventional to utilize the pivotal connections between adjacent ends of the links of the track chain for the driving connection which is engaged by sprocket teeth of a drive sprocket wheel. Thus, the pivotal connections, which are conventionally a circular pin, are subjected to the greatest wear during use.

Ideally, the peripheral surface of the pivotal connection is substantially equal to the configuration of the base of the teeth sprocket so that a large contact area is provided for the driving connection between the track chain and the drive sprocket. However, since the wear occurs predominately on one surface of the sprocket teeth, due to the nature of the load imposed thereon, the contact area between the sprocket teeth and the pivotal connection after only short periods of use is only a line contact along the length of the pivotal connection.

Furthermore, due to the configuration of pivotal connections, particularly the bushings which define the contact point between the track chain and the drive sprocket, the normal tensioning devices for the track chains are not capable of compensating for wear which occurs between the contacting surfaces.

SUMMARY OF THE INVENTION

The present invention provides a simple and efficient track bushing which provides for efficient rolling contact along its length between the drive sprocket and the bushing and which is wedge configured so that the wear occuring between the surfaces is conveniently compensated for by the conventional tensioning devices which are normally associated with the track chains. Furthermore, the bushing is particularly for quick and inexpensive fabrication. This is accomplished by providing a bushing having angularly inclined surfaces which form a generally wedged-shaped member with the subject surfaces cooperating with adjacent surfaces defined on the sprocket teeth of the drive sprocket.

The principle object of the present invention is to provide a new and different bearing member forming part of the pivotal connection between links of a track chain and which not only provides an efficient driving connection between the track chain and the drive sprocket, but also easily fabricated.

Another object of the invention is to provide an improved method of forming bushing members for use in connection with track chains.

A further object is an improved bushing for a track chain which provides a rolling contact area and is suitable for effective compensation for wear between the contacting surfaces which form the driving engagement for the track chain.

Other objects of this invention will appear in the following description and appended claims reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
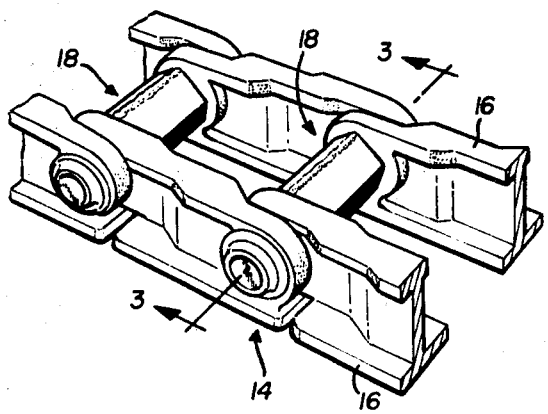
FIG. 2 is an enlarged perspective view of a plurality of chain links which have the bushing of the present invention incorporated therein.
Figure 1:
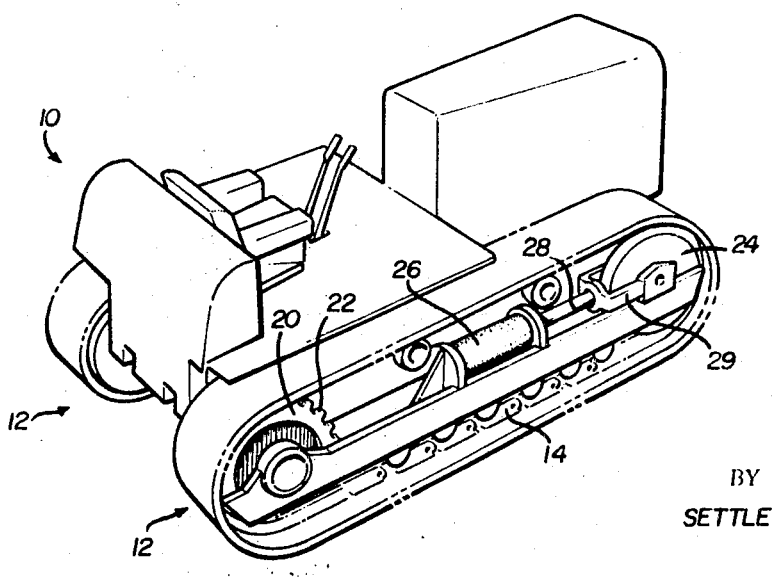
FIG. 1 is a perspective view of a track-type of tractor illustrating a track assembly in which the present invention is employed.
Figure 4:
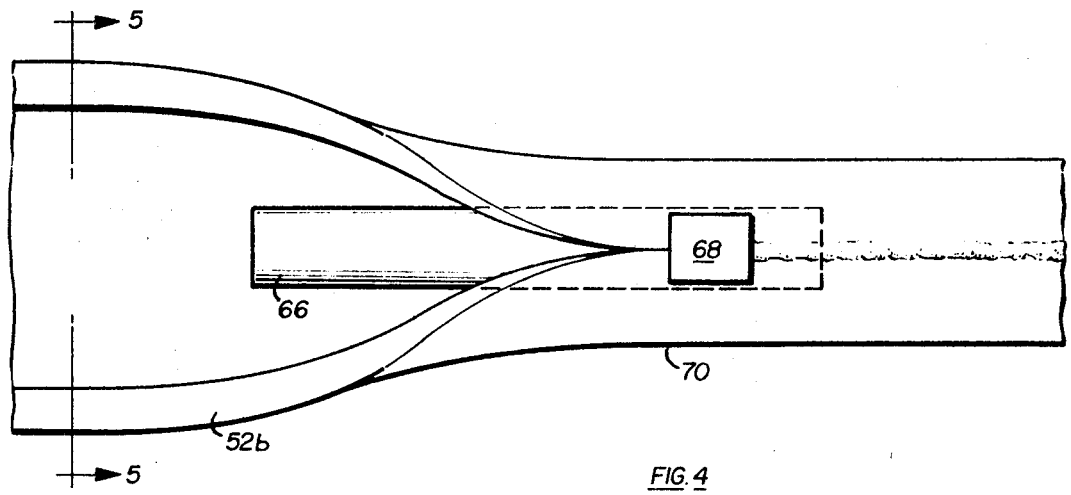
FIG. 4 is a plan view of a piece of stock material showing the various steps of forming the bushing of the present invention.

Referring to FIG. 1 of the drawings, there is shown a track-type tractor, generally indicated at 10, which comprises a pair of track assemblies 12 which support and propel the frame and working parts of the tractor. Each track assembly 12 comprises an endless chain 14 having links 16 (FIG. 2) pivotally joined by pivotal connections 18 to permit the tract to traverse a path around a driving sprocket 20 having sprocket teeth 22 and a driven idler sprocket 24 which is spring biased or otherwise movable to adjust the tension of the track chain. In the illustrated embodiment, the tensioning device is in the form of a hydraulic cylinder 26 having a piston rod 28 attached by a clevis 29 to idler sprocket 24 so as to adjust the tension of the track chain 12 through the idler or driven sprocket 24.

Figure 3:
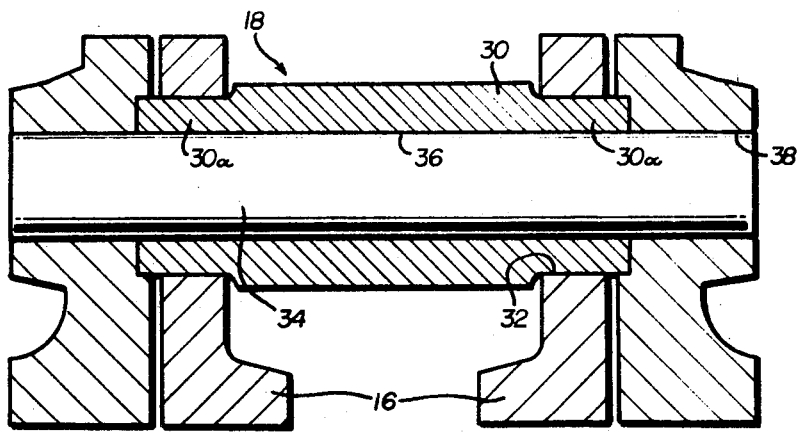
FIG. 3 is a vertical sectional view taken along lines 3—3 of FIG. 2.

The pivotal connection 18 for each set of links is more clearly shown in FIG. 3 and includes a bushing 30 having opposite ends 30a received in bores or openings 32 defined on one end of each of the links 16. The connection between the bushing and the link is a press fit or "drive fit."

The pivotal connection 18 also includes a pin 34 extending through an opening or aperture 36 defined through the bushing 30 and rotatable therein with the opposite ends of the pin 34 received in cooperating bores or openings 38 defined on the opposite ends of the respective links. Thus, one end of each pair of links which cooperate with each other defines an inner link which is connected to the bushing while the opposite end of the pair of links define the outer end of the link which are connected to the pin 34.

As was indicated hereinabove, the bushing 30 is engaged by the sprocket teeth 22 to drive the track chain and thus propel the vehicle along the ground. Also, as was indicated above, heretofore it has been conventional to provide a circular bushing of the type disclosed in U.S. Pat. Nos. 2,882,103 and 3,206,258. However, bushings or driving connections of this type have the rather serious drawbacks which were innumerated hereinabove.

According to the present invention, the construction of the bushing 30 is modified so as to provide an extended wedged-shaped configuration but without sacrificing the benefits of rolling contact between the engaging surfaces of the bushing and the sprocket teeth with the connection being such that the normal wear between the driving or contacting surfaces may be automatically compensated for through the use of the conventional tensioning devices forming part of the crawler tractor.

Figure 6:
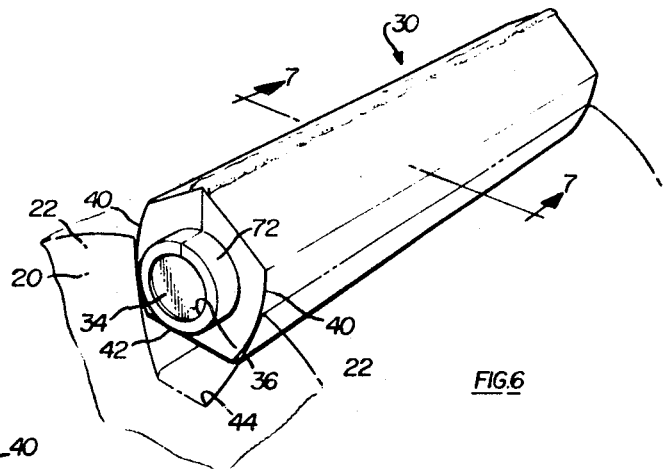
FIG. 6 is a perspective view of the completed bushing of the present invention.
Figure 7:
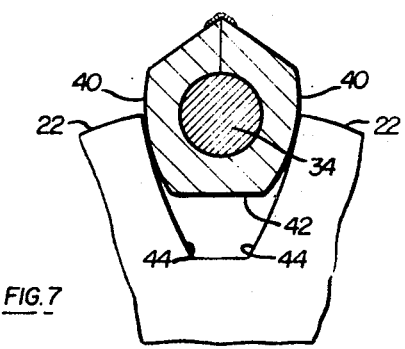
FIG. 7 is a vertical sectional view of the bushing of FIG. 6 shown in relation with a portion of a drive sprocket.

As more clearly shown in FIGS. 6 and 7, the bushing 30 is formed in a generally polygonal exterior surface so as to provide inclined arcuate contacting surfaces 40 which are engaged by the cooperating surfaces 44 defined on the respective track teeth. In the illustrated embodiment of the present invention, the peripheral surface of the bushing 30 is in the general form of a pentagon. However, as will become apparent hereinafter, it is only necessary that a pair of inclined surfaces 40 be provided.

More specifically, the bushing 30 provides along its length rolling contact between the driving portion of the sprocket 20 and the bushing member 30. For this purpose, the present bushing incorporates a pair of inclined curved surfaces 40 which form an acute angle with respect to each other and extend parallel to the axis of the opening 36 defined within the bushing 30. These surfaces 40 being arcuate with a radius extending from the center of the opening 36 form what may be termed a wedge which has its lower end removed with the adjacent ends of the surfaces 40 interconnected by a wall 42.

The inclined surfaces 40 defined by the wedge-shaped portion cooperate with cooperating surfaces 44 defined on opposite sides of the teeth 22 forming part of the drive sprocket 20. These surfaces 44 can be straight or slightly convex or slightly concave. If concave their radius should be slightly larger than the radius of the arcuate surfaces 40. Thus, it will be seen that rolling contact is provided between the teeth 22 and the bushing 30.

A further advantage of the present construction of the bushing is that the wear which is occasioned due to the frictional contact between the driving surfaces 40 and 44 of the respective members, which results in a loose fit between the respective teeth 20 and the bushing 30 after a short period of use, can be automatically adjusted by the conventional tensioning devices. Thus, the wedge-shaped configuration of the bushing allows the bushing to move further towards the base of the sprocket teeth as the surfaces begin to wear. Of course, any looseness of the track chain due to the movement of the bushing into the sprocket teeth can readily be compensated for by the adjustment of the tensioning devices described hereinabove.

According to a further aspect, an improved method of making the present bushings form another part of the present invention. Applicant has found that the particular configuration of the bushing shown in FIG. 6 may readily be produced by a simple and efficient continuous process which begins with a cold rolled steel blank of a specific configuration. Thus, as more clearly shown in FIG. 5, it has been found that a cross-sectional configuration of a blank as illustrated can readily be deformed so as to produce the finished product shown in FIG. 6.

Figure 5:
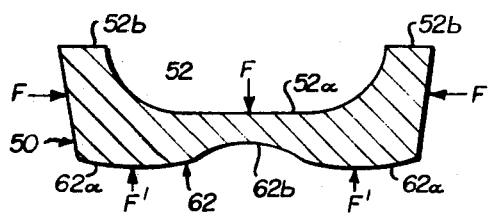
FIG. 5 is a vertical sectional view taken along lines 5—5 of FIG. 4.

As shown in FIG. 5, the cross-sectional configuration of the blank 50 includes a first wall 52 having an arcuate or dish-shaped surface 52a and two flat end portions 52b on opposite ends of the surface 52a. The portion 52a of the wall 52 conforms to a partially developed surface which is adapted to define the wall of the aperture 36 of bushing 30. Thus, the partially developed surface 52a, when properly deformed, defines the wall or surface of the opening or aperture 36 in the bushing 30. The blank 50 further includes a second or opposed wall 62 which is in the form of arcuate surfaces 62a interconnected by an intermediate recessed or connecting section 62b, for a purpose which will be described later.

The final configuration of the bushing 30 may readily be produced by deforming the blank of the configuration shown in FIG. 5 to a final cross-sectional configuration shown in FIG. 7. This may be accomplished by applying a force in the areas generally designated by the arrows F and F1 of FIG. 5. The forces of course may be produced in various different ways, such as for example by a conventionally well-known rolling process wherein a blank stock of indeterminate length is passed between a series of successive sets of rollers to deform the blank in a manner that the wall portions 52b of the blank are moved to a juxtaposed or contacting relationship. In the actual deforming process, it is desirable to utilize a mandrel 66 during the deformation process so as to insure that the wall portion or surface 52a is deformed from the partially developed surface shown in FIG. 5 to a true circular configuration shown in FIG. 7. Of course, the mandrel 66 may be maintained or held in a proper position by any suitable frame structure (not shown). After the blank is deformed from the configuration of FIG. 5 to that of FIG. 6 the contacting surfaces 52b are secured in a conventional manner by a device 68, as by a continuous welding process, to provide a unitary structure.

As was indicated hereinabove, all of the above steps may be accomplished by moving a blank of stock material of indeterminate length along a predetermined path with series of rollers disposed along the path to deform the blank from the configuration of FIG. 5 to the configuration of FIG. 7 and, thereafter, the adjacent walls or seams 52 may be welded by a continuous welding process generally indicated at 68 and the final blank may thereafter be cut into suitable sections 70 of predetermined length which define the finished length of the bushing.

According to a further aspect of the present invention, the blank sections 70 are preferably machined or otherwise processed so as to provide a circular hub 72 surrounding the opening or aperture 36 adjacent the opposite ends of the bushing. These hubs or projections 72 define the portions of the bushing 30a which are received in the bores or openings 32 formed on one end of each of the links in a press fit manner so as to provide a fixed connection between the links and the bushing. Of course the pentagonal configuration could be utilized for the fixed connection, if desired, merely by providing a pentagonal opening 32 in the links 16.

As can readily be appreciated from the above description, the present invention provides a simple and efficient manner of making an improved bushing and in which the final article has improved characteristics which will allow for automatic compensation for any wear between the contacting surfaces of the bushing and the contacting surfaces of the drive sprocket.

We claim:

1. A drive bushing forming part of a hinge connection between links of a tractor chain having adjoining sets of links each having bores aligned with each other in which the outer ends of said drive bushing are received; said drive bushing comprising: a body portion of substantially pentagonal cross section having an axial bore for receipt of a pivot pin therein; said pentagonal cross section defining a pair of opposite arcuate bearing surfaces extending the length of said bushing in parallel relation to the axis of said bore; said arcuate bearing surfaces being generated along a radius having the axis of said bore at its center.

2. A drive bushing as defined in claim 1, and wherein the body is provided with hub portions at each end surrounding said bore.

3. In combination with a sprocket wheel provided with teeth each of which having oppositely curvilinearly inclined contact surfaces and a bottom wall therebetween, a tract chain having a plurality of drive bushings each having a polygonal generally wedge-shaped body portion provided with an axial through bore and a pair of opposite arcuately inclined surfaces extending the length thereof substantially parallel to the axis of said bore, a pivot pin extending through said bore and links positioned on each side as to form an endless chain, said sprocket teeth contact surfaces being formed so as to have an arcuate inclination substantially extending along the same radius as the arcuately inclined surfaces on said drive bushings to mesh therewith and form a bearing connection therebetween to thereby provide maximum bearing area contact between said surfaces, said wedge-shaped drive bushings always spaced from said bottom wall of the sprocket and adjustable toward said bottom wall to compensate for wear of the bearing surfaces of said bushing and sprocket.

4. The combination as defined in claim 3, in which said track chain is composed of a plurality of adjoining links having aligned bores and the opposite ends of said bushings are provided with cylindrical hub portions of reduced diameter to be received in said bores to secure said bushings to said links.